Patented June 13, 1950

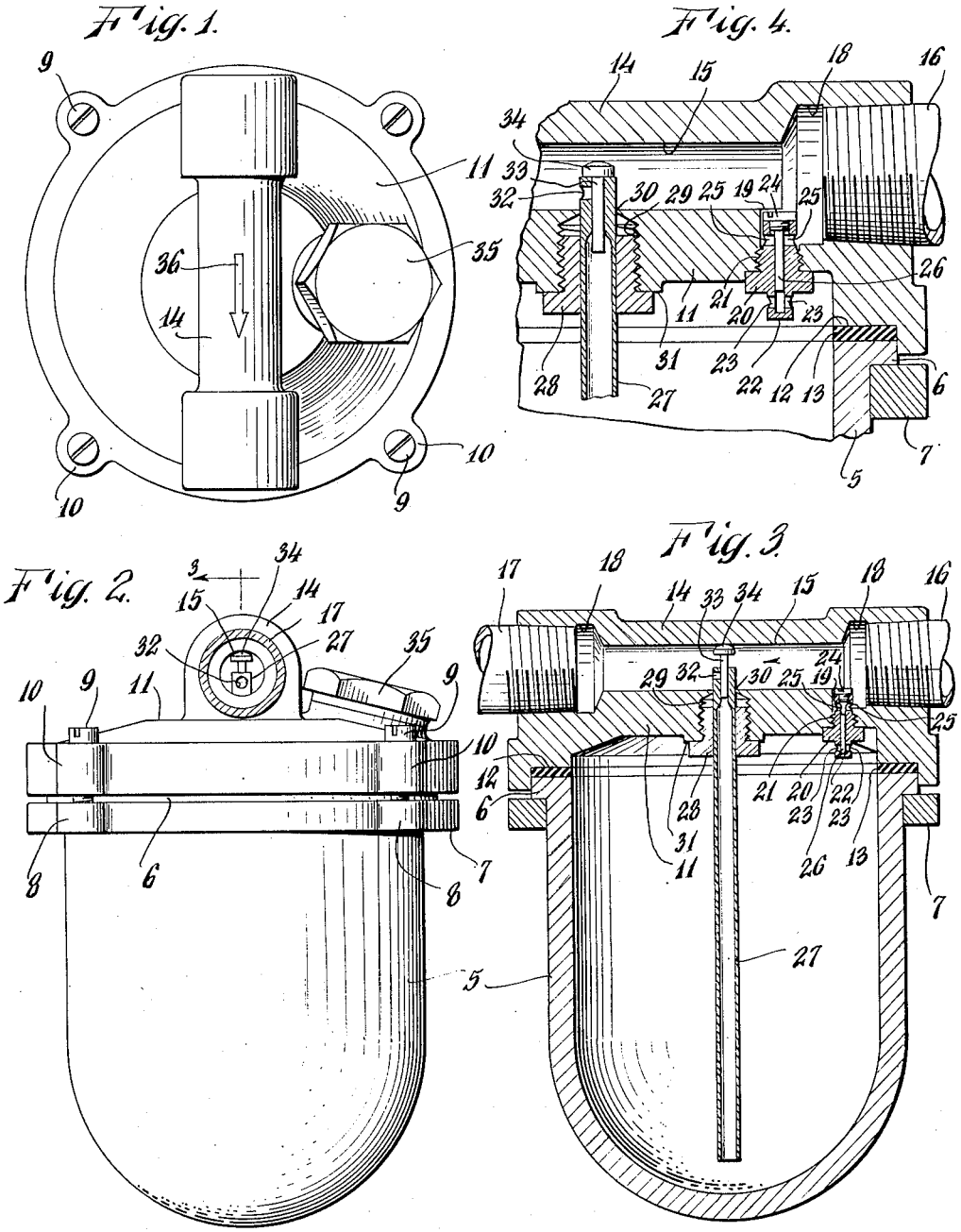
June 13, 1950 — A. L. SEMON — 2,511,016
DEVICE FOR LUBRICATING FLUID PRESSURE OPERATED MEANS
Filed Oct. 29, 1946 — 2 Sheets-Sheet 1
INVENTOR.
A. L. Semon
BY John A. Seifert
ATTORNEY.

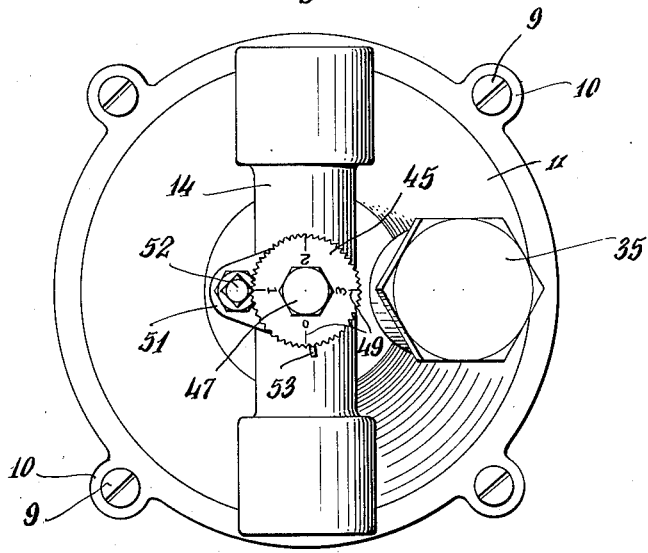
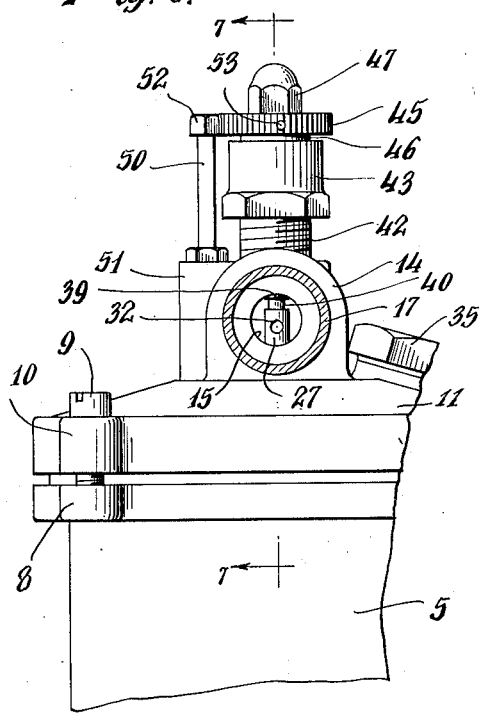
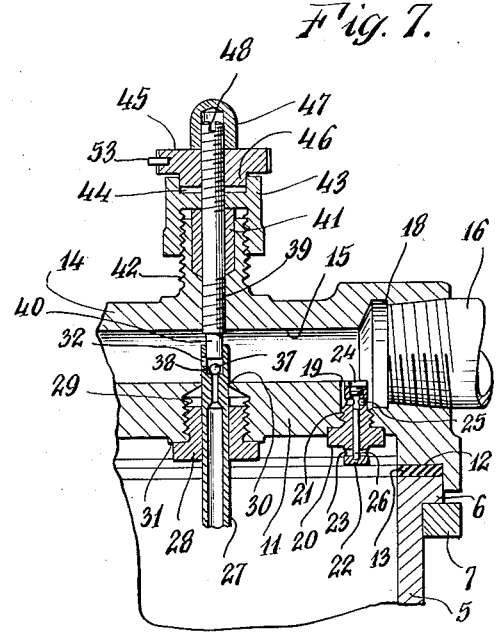

2,511,016

UNITED STATES PATENT OFFICE 2,511,016

DEVICE FOR LUBRICATING FLUID PRESSURE OPERATED MEANS

Albert L. Semon, Short Hills, N. J.

Application October 29, 1946, Serial No. 706,403

11 Claims. (Cl. 184—55)

This invention relates to devices for lubricating fluid pressure operated means, such as pneumatic tools, by delivering a spray of lubricant in a conduit connecting a source of supply of fluid pressure in communication with the fluid pressure operated means.

It is the principal object of the invention to provide control means in a fluid pressure inlet and lubricant outlet of a lubricant containing receptacle which will prevent the building up of fluid pressure in the receptacle when the fluid pressure operated means is shut off from the fluid pressure supply. Said accumulated pressure in the receptacle will cause the delivery of an undue amount of lubricant to said fluid pressure operated means upon opening the communication between the fluid pressure operated means and the fluid pressure supply and the consequent gumming of the working parts of the fluid pressure operated means.

It is another object of the invention to provide bleeding valves in said fluid pressure inlet and lubricant outlet of the lubricant containing receptacle to permit passage of a small volume of pressure into and a small quantity of lubricant out of the receptacle.

A further object of the invention is to provide adjustment of the valve at the lubricant outlet of the receptacle.

Other objects and advantages of the invention will be hereinafter described.

In the drawings accompanying and forming a part of this application:

Figure 1 is a view looking at the top of the device forming the embodiment of the invention.

Figure 2 is an elevational view of said device.

Figure 3 is a sectional view taken on the line 3—3 of Figure 2 looking in the direction of the arrows.

Figure 4 is a fragmentary view, on an enlarged scale, of the upper right hand portion of Figure 3 showing the bleeding valves in one extreme position of movement opposite to the position shown in Figure 3.

Figure 5 is a view similar to Figure 1 showing a modification of the device shown in Figures 1 to 4, inclusive, and embodying means to adjust the valve at the lubricant outlet of the receptacle.

Figure 6 is a fragmentary side elevational view of the device having the modification shown in Figure 5.

Figure 7 is a sectional view taken on the line 7—7 of Figure 6 looking in the direction of the arrows to show the structure of the valve adjusting means.

The embodiment of the invention illustrated in the accompanying drawings comprises a cup shaped receptacle 5 of suitable opaque or transparent material, such as metal, glass or plastic, for containing a supply of lubricant, such as oil. The upper open end of the receptacle is arranged with an outwardly extending annular flange 6 for the engagement of an annular member or ring 7 having equidistantly spaced projections 8 extended from the periphery of the ring and having screw threaded recesses for the engagement of screws 9 engaged in openings in corresponding projections 10 extending from a head 11, as shown in Figures 1, 2, 5 and 6.

The head 11 hermetically closes the open end of the receptacle 5 by being provided with an annular seat 12 corresponding to the edge of the receptacle wall to engage said edge with a gasket 13 interposed between the seat and edge, as shown in Figures 3, 4 and 7, and the head retained on the receptacle by the screws 9, as shown in Figures 1, 2, 5 and 6.

A tubular boss 14 is arranged on top of and integral with the head and extended transversely of the center thereof. The bore of the boss is of uniform diameter to form a passage 15, as shown in Figures 3, 4 and 7, with the opposite end portions of the passage enlarged and screw threaded for the engagement of the screw threaded ends of a conduit or pipe 16 connected in communication with a source of supply of pressure, such as an air compressor, not shown, and a conduit or pipe 17 connected in communication with a fluid pressure operated means, such as a pneumatic tool, not shown. The screw threads in the enlarged ends of the passage are spaced from the juncture between the body of the passage and the opposite enlarged end portions thereof to provide an enlarged annular space between the body of the passage and the ends of the pipes 16 and 17, as shown at 18 in Figures 3, 4 and 7. The fluid pressure or compressed air flows through the passage 15 in the direction of the arrow shown in Figure 3 and a controlled amount of said pressure or air is supplied to the top of the receptacle above the lubricant or oil therein through a restricted port in the head 11 formed by providing an opening or passage 19 extended through the head 11 at a right angle to the passage 15 and adjacent to the enlarged space 18 at the outlet of pipe 16 with the opposite ends of said opening communicating with the passage 15 and the top of the receptacle 5. A tubular plug is mounted in said opening 19 and comprises a head 20 intermediate the ends thereof to abut the inner face of the head 11 and a screw threaded shank portion 21 between said head 20 and one end of the plug and screw threaded in the end portion of the opening 19 adjacent to the inner face of the head 11. The end of the plug nearest to the head 20 is closed by an integral wall 22 and the wall portion between said closed end wall 22 and the head 20 is provided with opposed alined perforations or openings 23 for lateral passage of the fluid pressure or air into the receptacle 5. The opposite end of the plug nearest the screw threaded shank portion 21 is closed by another plug in the form of a screw 24 screw threaded in the bore of the plug 20—23 at said end and the portion of the plug 20—23 between the screw plug 24 and the screw threaded shank portion 21 is provided with opposed alined perforations or openings 25 for the reception of the fluid pressure or air from the enlarged annular portion 18. The diameter of the opening 19 is slightly larger than the end portion of the plug 20—23 arranged with the screw plug 24 and openings 25 to permit the free flow of fluid pressure or air from the annular portion 18 and the pipe 16 into the bore of the plug 20—23 through the openings 25, as shown in Figures 3, 4 and 7. The flow of the fluid pressure or air through the bore of the plug 20—23 is restricted by a rod shaped member 26 of slightly less diameter than the bore of the plug 20—23 to permit a flow of fluid pressure or air from the openings 25 to the openings 23. The length of the rod member 26 is such that when one end of said member abuts the closed end wall 22 the opposite end of the rod member is clear of the openings 25, as shown in Figures 3 and 7, and when said opposite end of the rod member abuts the screw plug 24 the first end is clear of the openings 23, as shown in Figure 4.

The lubricant or oil in the receptacle 5 is discharged as a fine spray or mist into the passage 15 by the fluid pressure or air entering the receptacle through the plug 20—23 and forcing the lubricant or oil up through a tube 27 mounted at one end portion in a tubular plug 28 by suitable means, such as sweating the tube 27 in the bore of the plug 28. The plug 28 is screw threaded to engage screw threads in an opening 29 in the center of the head 11 and communicating with the passage 15 and the receptacle 5. The end of the opening 29 communicating with the passage 15 is tapered to engage an end portion of the tube 27 extending into the passage 15, as shown at 30 in Figures 3, 4 and 7, and the opposite end of the opening 29 is encircled by a shoulder on the head 11 to be engaged by a head of the plug 28, as shown at 31. The bore in the portion of the tube 27 extending from the plug 28 into the passage 15 is of smaller diameter than the diameter of the bore of the remaining portion of the tube and said bore portion of smaller diameter communicates with the passage 15 through an opening or port 32 extending through the wall portion of the tube facing the outlet pipe 17. The end of the tube 27 opposite the end arranged with the opening 32 terminates adjacent to the bottom of the receptacle 5 so that said end of the tube constituting the inlet end thereof lies below the level of the lubricant or oil in the receptacle. In Figures 1 to 4, inclusive, the bore portion of smaller diameter of the tube 27 extends to the end of said tube terminating in the passage 15 and slidably supports a rod shaped member 33 of slightly less diameter than the diameter of said bore portion and having a head 34 at one end to limit the sliding movement of the rod member 33 in the tube 27 by either engaging the end of the tube 27, as shown in Figure 4, or engaging the portion of the wall of the passage 15 opposite said tube end, as shown in Figures 2 and 3.

The space or clearance between the rod member 26 and the wall of the bore in plug 20—23, and the space or clearance between the rod member 33 and the wall of the bore of smaller diameter in the tube 27 are the same, so that the flow of fluid pressure or air through the plug 20—23 into the receptacle and the flow of the lubricant or oil through the port 32 into the passage 15 will be the same when the communication between the tool connected to the pipe 17 and the source of supply of fluid pressure or compressor connected to the pipe 16 is opened. During the normal operation of the tool, said communication is controlled by a valve at the tool, and when the normal operation of the tool is completed, the communication is closed by a valve at the source of supply of fluid pressure or compressor. It has been found that a clearance of five thousandths of an inch between the rod member 26 and the wall of the bore of the plug 20—23 and between the rod member 33 and the wall of the bore portion of smaller diameter of the tube 27 gives satisfactory results. The rod members 26 and 33 act as bleeding valves.

In Figures 5 to 7, inclusive, there is shown a modified form of valve for controlling the discharge of lubricant or oil through the port 32 comprising a ball 37 of slightly greater diameter than the bore portion of smaller diameter of the tube 27 and engaged in an enlarged end 38 of said bore portion at the extremity of the tube 27, as shown in Figure 7. The enlarged end 38 of the bore portion of smaller diameter of the tube 27 communicates with the port 32. The amount of movement of the ball 37 toward and away from the bore of smaller diameter of the tube 27 caused by the flow of lubricant in the tube 27 and the pressure in the passage 15 is varied by an adjustable member 39 having screw threads on the opposite end portions with the center portion smooth and a smooth portion 40 of reduced diameter extending from one of the screw threaded end portions and slidable in the enlarged end 38 of the tube 27 to engage the ball 37. The adjustable member 39 is adjustably mounted in the boss 14 by engaging the screw threaded end portion adjacent to the reduced portion 40 in a screw threaded opening in the wall portion of the boss in opposed relation to the opening 29 in the head 11, as shown in Figure 7. The smooth center portion of the adjustable member 39 is engaged by a packing 41 engaged in a stuffing box 42 integrally arranged on the center of the boss 14 and having external screw threads for the engagement of a cap member 43 having an external recess 44 in the closed end thereof and slidably engaged on the portion of the adjustable member 39 extending from the stuffing box 42, as shown in Figure 7. The cap member is tightened on the stuffing box to compress the stuffing therein. The adjustable member 39 is manipulated by a knob 45 screw threaded on the screw threaded end portion of the adjustable member projecting from the cap member 43 and having a reduced under face portion 46 slidable in the recess 44 of the cap member 43. The periphery of the body of the knob is serrated to facilitate actuation of the same. The knob is clamped to the adjustable member 39 by a cap 47 screw threaded on the screw threaded end portion of the adjustable member projecting from the knob 45. In assembling the adjustable member 39 in the boss 14, said member is first adjusted by a screw driver engaged in a slot 48 in the projecting end of the adjustable member to engage the reduced portion 40 with the ball 37 and seat said ball against the bore of smaller diameter of the tube 27. Then the knob 45 is adjusted on the member 38 to abut the cap member 43 with the reduced portion 46 fully engaged within the recess 44. Subsequently the cap 47 is engaged on the projecting end of the member 39 and tightened against the knob. To indicate the position of the reduced portion 40 relative to the ball 37, the knob 45 is arranged with indicia on the upper face thereof spaced ninety (90) degrees apart, as indicated at 49 in Figure 5, and adapted to be positioned relative to a post 50 fixed at one end in a lateral extension 51 of the boss 14, as shown in Figure 6, and having a square head 52 at the opposite end with one corner adjacent to the serrated periphery of the knob 45 so that the indicia may be positioned in alinement with said corner, as shown in Figure 5, and said corner constituting a pointer. The adjustment of the adjustable member 39 is limited to one revolution of the knob 45 in either direction by a pin 53 fixed in and projecting from the periphery of the knob 45 to engage the opposite sides of the corner of the head 52 positioned adjacent to said perihpery. When the reduced portion 40 abuts the ball 37, the indicium "0" is in register with the pointer corner of the head 52 and the adjustment of the head 45 to successively position the indicia "1," "2" and "3" relative to the pointer corner of the head 52 will progressively adjust the reduced portion 40 from the ball 37 to permit greater movement of the ball from the bore portion of smaller diameter of the tube 27 and a greater amount of lubricant or oil to be discharged through the port 32. In the position of the adjustable member shown in Figures 5 to 7, inclusive, the knob is adjusted with the indicium "1" in register with the pointer corner of the head 52 and the reduced portion 40 slightly spaced from the ball 37 in seated position. When the knob is adjusted with the indicia "1," "2" or "3" in register with the pointer corner of the head 52, the ball 37 will function in the same manner as the rod member 33.

The flow of fluid pressure or air through the passage 15 from pipe 16 to pipe 17 will also create a vacuum around the end portion of the tube 27 extending into the passage 15 and in front of the port 32 tending to draw the lubricant or oil up the tube 27 from the receptacle 5 through the port 32 into the passage 15. Variations in the fluid pressure or air in the pipes 16 and 17 and passage 15 will cause the rod members 26 and 33, or rod member 26 and ball 37, to reciprocate and control the flow of the fluid pressure or air from the pipe 16 through the plug 20—23 into the receptacle and the flow of lubricant or oil from the receptacle through the port 32 into the passage 15 and pipe 17. The sliding movements of the rod members 26 and 33 will maintain the bore of the plug 20—23 and the reduced bore portion of the tube 27 clear of any accumulation of dirt carried by the air or oil.

The supply of lubricant or oil in the receptacle 5 is replenished through a filler opening in the head 11 closed by a screw threaded plug 35.

An arrow 36 is arranged on the tubular boss 14, as shown in Figure 1, to indicate the direction of flow of the fluid pressure or air in the passage 15, and in what ends of said boss the pipes 16 and 17 are to be mounted.

Having thus described my invention, I claim:

1. In a lubricating device for fluid pressure operated tools, a head having a passage adapted to be connected at the opposite ends in a conduit connecting a source of supply of fluid pressure in communication with a fluid pressure operated tool, a lubricant containing receptacle mounted on the head and communicating with the passage through a port in said head, a member slidably mounted to have free movement in said port and actuated solely by fluid pressure to regulate the volume of fluid pressure entering the receptacle, a tube carried by the head and having one end portion terminating in the passage and arranged with an opening in the wall thereof facing in the direction of the flow of fluid pressure in said passage and the opposite end of the tube terminating below the level of the lubricant in the receptacle to provide a flow of lubricant from the receptacle into the passage under the force of the fluid pressure in the receptacle, and a second member movably mounted in the end portion of the tube having the opening in the wall thereof and actuated by the fluid pressure and the lubricant to regulate the flow of lubricant from the receptacle through said opening into the passage.

2. A lubricating device for fluid pressure operated tools as claimed in claim 1, wherein the slidable members have a predetermined clearance with the port and tube of the same dimension.

3. A lubricating device for fluid pressure operated tools as claimed in claim 1, wherein the port in the head comprises a bore closed at the opposite ends and having lateral openings adjacent said closed ends, the lateral openings at one end communicating with the passage and the lateral openings at the opposite end communicating with the receptacle, and the first member being of less length than the bore and having sliding movement therein limited by the closed ends of the bore.

4. A lubricating device for fluid pressure operated tools as claimed in claim 1, wherein the port in the head comprises a bore closed at the opposite ends and having lateral openings adjacent said closed ends, the lateral openings at one end communicating with the passage and the lateral openings at the opposite end communicating with the receptacle, and the first member comprising a rod of less diameter and length than the bore to have sliding movement therein limited by the closed ends of the bore.

5. A lubricating device for fluid pressure operated tools as claimed in claim 1, wherein the second member comprises a rod having a head at one end to limit the sliding movement of said rod in the tube by said head engaging the end of the tube in one extreme position of movement and engaging the wall of the passage in the other extreme position of movement.

6. A lubricating device for fluid pressure operated tools as claimed in claim 1, wherein the bore of the end portion of the tube arranged with the opening in the wall thereof is of less diameter than the diameter of the bore of the remaining portion of the tube, and the second member comprises a rod of less diameter than and slidable in the bore portion of smaller diameter of the tube.

7. A lubricating device for fluid pressure operated tools as claimed in claim 1, wherein the bore of the end portion of the tube arranged with the opening in the wall thereof is of increased diameter relative to the adjacent bore portion of the tube, and the second member comprises a ball engaged in said bore portion of increased diameter and adapted to have limited movement toward and away from the adjacent bore portion of the tube.

8. In a lubricating device for fluid pressure operated tools, a head having a passage adapted to be connected at the opposite ends in a conduit connecting a source of supply of fluid pressure in communication with a fluid pressure operated tool, a lubricant containing receptacle mounted on the head and communicating with the passage through a port in said head, a member slidably mounted in said port to regulate the volume of fluid pressure entering the receptacle, a tube carried by the head and having one end portion terminating in the passage and arranged with an opening in the wall thereof facing in the direction of the flow of fluid pressure in said passage and the opposite end of the tube terminating below the level of the lubricant in the receptacle to provide a flow of the lubricant from the receptacle into the passage under the force of the fluid pressure in the receptacle, a ball mounted in the end of the tube arranged with the opening in the wall thereof to control the discharge of lubricant through said opening, and a member adjustably mounted in the head to have adjustment toward and away from the ball to vary the amount of movement of the ball toward and away from the bore of the tube and the amount of lubricant discharged through the opening in the wall of the tube.

9. A lubricating device for fluid pressure operated tools as claimed in claim 8, wherein the adjustable member has limited adjusting movement.

10. A lubricating device for fluid pressure operated tools as claimed in claim 8, wherein the adjustable member is arranged with a manipulating knob exteriorly of the head arranged with spaced indicia, a post mounted on the head and having a pointer adjacent to the knob to indicate the position of the adjustable member relative to the ball, and said knob having a projection to engage the pointer and limit the adjustment of the adjustable member.

11. The combination with fluid pressure operated means, a source of fluid pressure and a conduit connecting the source of fluid pressure in communication with the fluid pressure operated means, a lubricant containing receptacle having an inlet in communication with the conduit and opening to the receptacle above the lubricant therein, lubricant outlet means from the receptacle having an inlet opening to the receptacle below the level of the lubricant therein and an outlet opening to the conduit in line with the flow of the fluid pressure therethrough, and means operative and controlled by a variance in the pressure in the lubricant receptacle to regulate the fluid pressure inlet to the lubricant receptacle from the conduit and admission of fluid pressure into the receptacle and regulate the outlet of the lubricant outlet means to the conduit and discharge of lubricant from the receptacle into the conduit.

ALBERT L. SEMON.

REFERENCES CITED

The following references are of record in the file of this patent:

UNITED STATES PATENTS

| Number | Name | Date |
|---|---|---|
| 1,721,231 | Osborne | July 16, 1929 |
| 1,755,240 | Clark | Apr. 22, 1930 |
| 1,757,084 | Hansen | May 6, 1930 |
| 2,187,241 | Kehle | Jan. 16, 1940 |
| 2,223,700 | Norgren | Dec. 3, 1940 |